Figure 4:
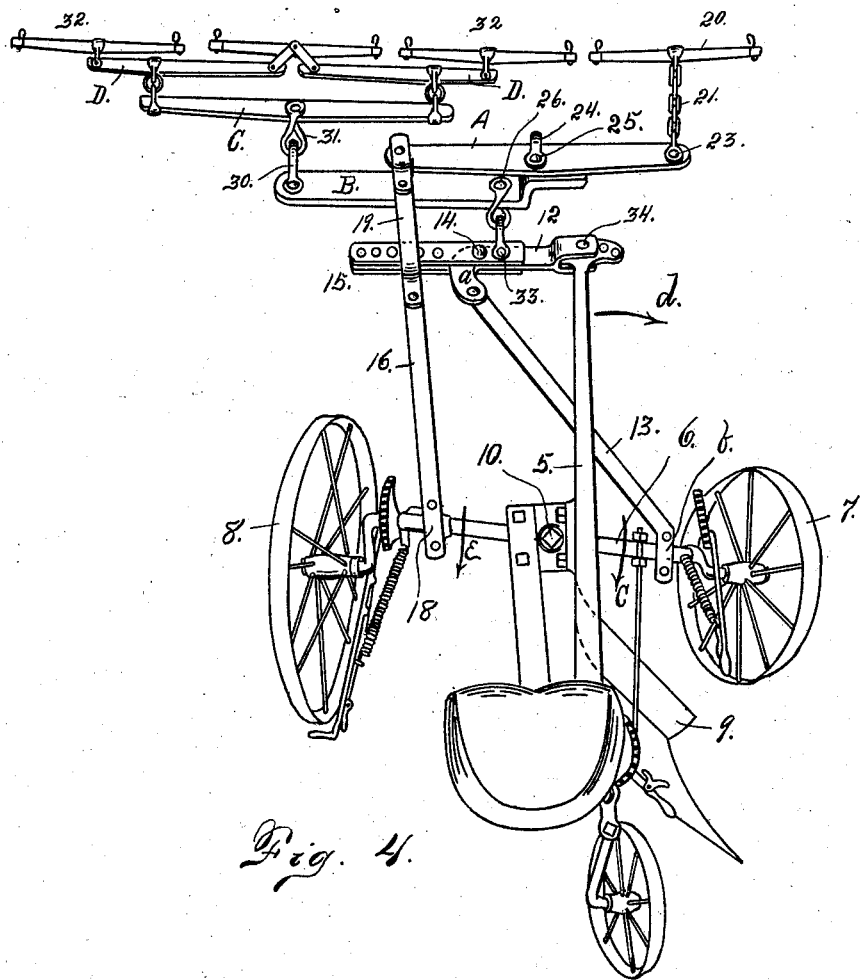

No. 746,649. PATENTED DEC. 8, 1903.
H. R. TOMSON.
DRAFT EQUALIZER.
APPLICATION FILED OCT. 3, 1903.
NO MODEL. 2 SHEETS—SHEET 1.
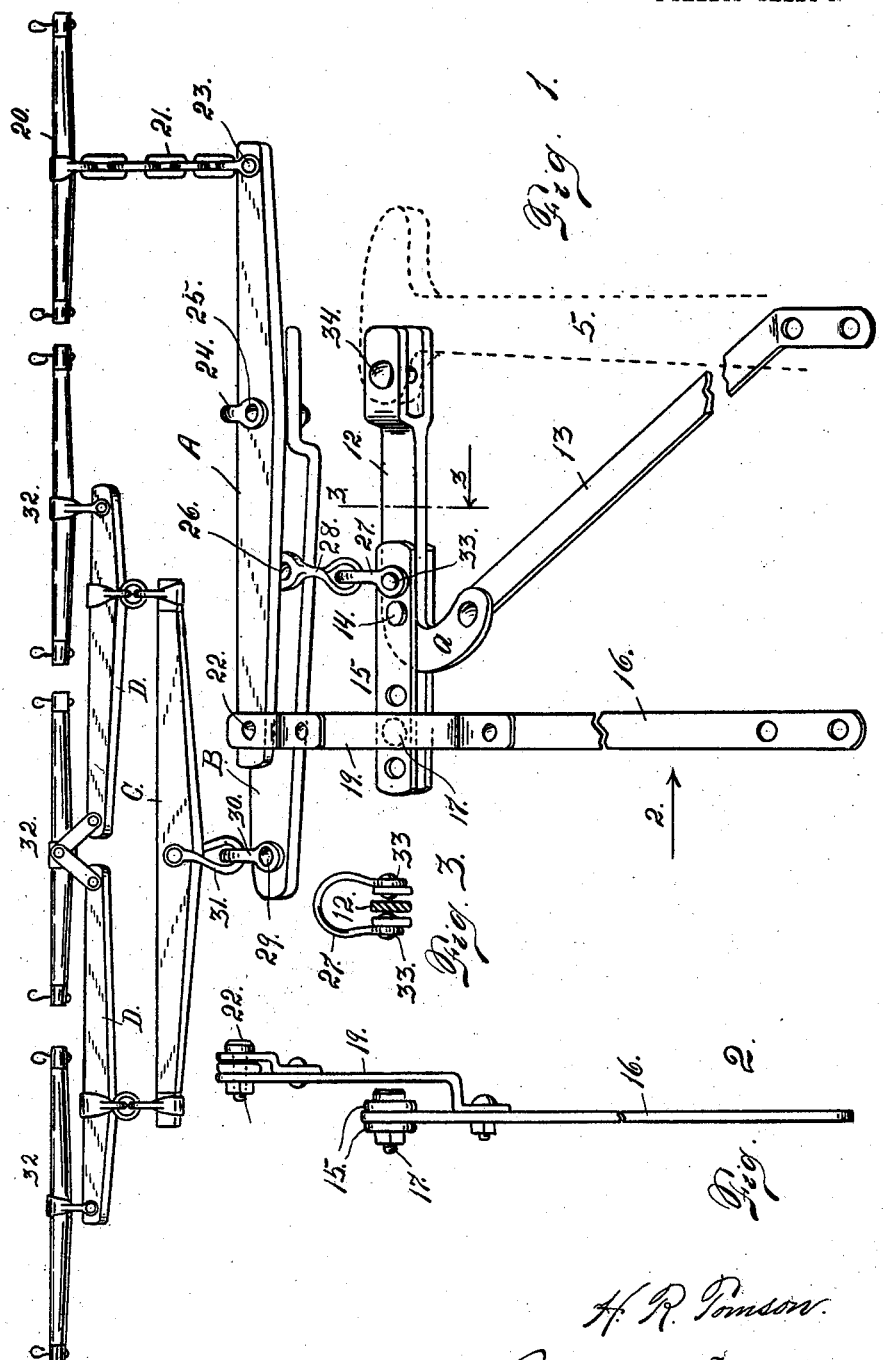
Witnesses
Otto E. Haddock.
Dena Nelson.
H. R. Tomson.
Inventor
By
Attorney No. 746,649. PATENTED DEC. 8, 1903.
H. R. TOMSON.
DRAFT EQUALIZER.
APPLICATION FILED OCT. 3, 1903.
NO MODEL. 2 SHEETS—SHEET 2.

Witnesses
Otto E. Hoddick.
Dena Nelson.

H. R. Tomson.
Inventor
By
Attorney

No. 746,649. Patented December 8, 1903.

UNITED STATES PATENT OFFICE.

HENRY R. TOMSON, OF EATON, COLORADO.

DRAFT-EQUALIZER.

SPECIFICATION forming part of Letters Patent No. 746,649, dated December 8, 1903.

Application filed October 3, 1903. Serial No. 175,603. (No model.)

*To all whom it may concern:*

Be it known that I, HENRY R. TOMSON, a citizen of the United States of America, residing at Eaton, in the county of Weld and State of Colorado, have invented certain new and useful Improvements in Draft Appliances; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in draft appliances, and while it is more especially adapted for use with sulky-plows it is evident that it may be employed to advantage in other relations.

The invention will now be described in detail, reference being made to the accompanying drawings, in which is illustrated an embodiment thereof.

In the drawings, Figure 1 is a perspective view of the apparatus, taken from the rear and looking downwardly. Fig. 2 is a detail view of one of the draft-bars. Fig. 3 is a section taken on the line 3 3, Fig. 1, viewed in the direction of the arrow. Fig. 4 is a view similar to Fig. 1, but on a smaller scale and showing the apparatus connected with the plow.

The same reference characters indicate the the same parts in all the views.

Let the numeral 5 designate the plow-beam, 6 the axle, 7 and 8 the wheels, and 9 the plow proper, of an ordinary sulky-plow apparatus. In this construction the plow-beam is rigidly connected with the axle at 10. To the forward extremity of the plow-beam is connected a bar 12, which when the parts are in the position shown in the drawings extends at right angles to the plow-beam and is provided with a part *a*, curved rearwardly. To the rear extremity of this part *a* is pivotally connected a bar 13, which extends diagonally to the direction of the plow's travel. This bar 13 crosses the plow-beam underneath the latter, and its rear extremity is rigidly connected with the axle on the right-hand side of the beam 5, as shown at *b*. Pivotally connected at 14 with the bar 12 is a bar 15, composed of two members, which straddle the bar 12. At the left of the pivot 14 the bar 15 is pivotally connected, as shown at 17, with the forward end of a draft-bar 16, whose rear extremity is rigidly connected with the axle 6 at the left of the plow-beam, as shown at 18. Rigidly connected with the bar 16 in the rear of the point 17 is an extension 19, whose forward extremity is bifurcated to receive the left-hand extremity of a lever A. To the opposite extremity 23 of this lever is connected a whiffletree 20 by a chain 21. A lever B is pivotally connected at its right-hand extremity with the lever A by a clevis-like device 24, located at a point 25 intermediate the extremities of the lever A. The lever B is pivotally connected at a point 26 intermediate its extremities with the bar 15 by means of a clevis 27 and an intermediate device 28. The clevis 27 is pivotally connected, as shown at 33, with each member of the bar 15 and on opposite sides of the bar 12. This point 33 is located near and to the right of the point 14 and between the point 14 and the point 34, where the bar 12 is connected with the plow-beam. The left-hand extremity of the bar B is pivotally connected, as shown at 29, with a three-horse evener C by a pair of clevises 30 and 31. The lever C, together with two auxiliary levers D D and the three whiffletrees 32, are all of ordinary construction, forming the regular three-horse-hitching apparatus.

When the apparatus is in use, four horses are hitched thereto—one to the whiffletree 20 and three to the three whiffletrees 32, respectively.

The function of my apparatus, or rather the advantage over the ordinary hitching means connected with a plow of this kind, consists in the fact that the plow proper is held firmly in line with its work, since the axle and wheels of the machine cannot turn to allow the plow proper to change its course, even if the latter strikes an obstruction. If the plow is resisted by a foreign object, as a stone, and when under ordinary circumstances there would be a tendency of the machine to twist in order to allow the plow to pass around the obstruction, if it be assumed that the tendency of the apparatus is to move so that the front portion of the plow-beam will be thrown in the direction of the arrrow *d* in Fig. 4, this movement of the plow-beam would have a tendency to throw the axle 6, located at the right of the plow-beam, in the direction of the arrow *c*; but this movement of the axle is resisted by the bar 13, whose forward extremity is connected with the bar 12 on the left-hand side of the plow-beam. Hence the tendency to throw the axle 6 in the direction of the arrow *c* is resisted by the bar 13, whose forward extremity is connected to hold the forward extremity of the plow-beam from moving laterally or in the direction of the arrow *d*. On the other hand, if the obstruction is such that there is a tendency of the plow-beam to move laterally in a direction opposite the arrow *d*, there is a tendency for the axle on the left-hand side of the plow-beam to move in the direction of the arrow *e* and the portion of the axle on the right-hand side of the plow-beam to move in a direction opposite the arrow *c*. Hence the tendency of the axle to move, as just explained, is resisted by the bar 13, which in the case last supposed is pressing forwardly on the bars 12 and 15 on the left side of the forward extremity of the plow-beam, and thus resisting the tendency of the plow to move out of its course.

This apparatus is found in practice to operate in the manner specified.

Having thus described my invention, what I claim is—

1. In a draft appliance for plows, the combination with a plow-beam, an axle to which the beam is rigidly connected, and wheels upon which the axle is mounted, of a bar 12 connected with the forward extremity of the plow-beam and extending laterally in one direction, a bar 13 connected with the bar 12 and extending diagonally rearwardly crossing the plow-beam, its rear extremity being rigidly connected with the axle on the side of the plow-beam opposite the forward extremity of the bar 13, a bar 15 pivotally connected with the bar 12 at a point 14, a bar 16 connected at its forward extremity with the bar 15 at a point 17, the rear extremity of the bar 16 being rigidly connected with the axle on the opposite side of the plow-beam from the rear extremity of the bar 13, and hitching apparatus connected with the bar 15 between the plow 14 and the end of the plow-beam.

2. In a draft appliance for plows, the combination with a plow-beam, an axle to which the beam is rigidly connected, and wheels upon which the axle is mounted, of a bar 12 connected with the forward extremity of the plow-beam and extending laterally in one direction, a bar 13 connected with the bar 12 and extending diagonally rearwardly crossing the plow-beam, its rear extremity being rigidly connected with the axle on the side of the plow-beam opposite the forward extremity of the bar 13, a bar 15 pivotally connected with the bar 12 at a point 14, a bar 16 connected at its forward extremity with the bar 15 at a point 17, the rear extremity of the bar 16 being rigidly connected with the axle on the opposite side of the plow-beam from the rear extremity of the bar 13, and hitching apparatus connected with the bar between the point 14 and the end of the plow-beam, said hitching apparatus including two levers A and B, one end of the lever B being connected with the lever A intermediate the extremities of the latter, a whiffletree connected with one end of the lever A, an extension of the bar 16 connected with the opposite extremity of the lever A, suitable hitching apparatus for a number of horses connected with the extremity of the bar B remote from its connection with the lever A, and a connection between the bar 15 and the lever B intermediate the extremities of the latter.

In testimony whereof I affix my signature in presence of two witnesses.

HENRY R. TOMSON.

Witnesses:
F. L. WELLER,
W. W. SULLIVAN.